United States Patent
Ramesh

(10) Patent No.: US 9,094,318 B2
(45) Date of Patent: Jul. 28, 2015

(54) REMOTE MIRRORING

(75) Inventor: Deepak Ramesh, Bangalore (IN)

(73) Assignee: Avaya Inc., Basking Ridge, NJ (US)

( * ) Notice: Subject to any disclaimer, the term of this patent is extended or adjusted under 35 U.S.C. 154(b) by 536 days.

(21) Appl. No.: 13/434,753

(22) Filed: Mar. 29, 2012

(65) Prior Publication Data
US 2013/0259046 A1 Oct. 3, 2013

(51) Int. Cl.
*H04L 12/26* (2006.01)
*H04L 29/06* (2006.01)

(52) U.S. Cl.
CPC ............. *H04L 43/12* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 5,515,376 A * | 5/1996 | Murthy et al. | 370/402 |
| 5,627,819 A * | 5/1997 | Dev et al. | 370/250 |
| 6,041,042 A | 3/2000 | Bussiere | |
| 7,486,674 B2 * | 2/2009 | Regan | 370/390 |
| 7,506,065 B2 * | 3/2009 | LaVigne et al. | 709/245 |
| 7,787,480 B1 * | 8/2010 | Mehta et al. | 370/401 |
| 7,843,866 B1 * | 11/2010 | Madnani et al. | 370/312 |
| 7,855,950 B2 * | 12/2010 | Zwiebel et al. | 370/216 |
| 8,027,347 B2 * | 9/2011 | Ould-Brahim | 370/397 |
| 8,116,307 B1 * | 2/2012 | Thesayi et al. | 370/389 |
| 8,155,118 B2 * | 4/2012 | Jorgensen et al. | 370/390 |
| 8,194,681 B2 * | 6/2012 | Kaarela et al. | 370/401 |
| 8,432,916 B2 * | 4/2013 | Li et al. | 370/392 |
| 2004/0003094 A1 * | 1/2004 | See | 709/227 |
| 2004/0213232 A1 * | 10/2004 | Regan | 370/390 |
| 2005/0069096 A1 * | 3/2005 | Claudatos et al. | 379/88.08 |
| 2005/0220091 A1 * | 10/2005 | LaVigne et al. | 370/389 |
| 2005/0278565 A1 * | 12/2005 | Frattura et al. | 714/5 |
| 2006/0059163 A1 * | 3/2006 | Frattura et al. | 707/10 |
| 2006/0143300 A1 * | 6/2006 | See et al. | 709/227 |
| 2006/0176880 A1 * | 8/2006 | Bare et al. | 370/392 |
| 2007/0071213 A1 * | 3/2007 | Claudatos et al. | 379/211.01 |
| 2009/0129384 A1 * | 5/2009 | Regan | 370/390 |
| 2011/0231570 A1 * | 9/2011 | Altekar et al. | 709/236 |
| 2011/0299532 A1 * | 12/2011 | Yu et al. | 370/392 |
| 2012/0082162 A1 * | 4/2012 | Li et al. | 370/392 |
| 2012/0243869 A1 * | 9/2012 | Sato | 398/49 |

* cited by examiner

*Primary Examiner* — Hicham Foud

(57) ABSTRACT

A method, system and computer readable medium for remote mirroring are described. The method can include receiving a customer data frame and making two copies of the customer data frame. An outer header, such as a mac-in-mac header, can be added to each copy. The outer header of the first copy can be configured for normal processing, while the outer header of the second copy can be configured for remote mirroring. A switch can recognize the header configured for mirroring in the second copy based on a service identifier in the header and process the second copy for mirroring on one or more ports on one or more bridges.

20 Claims, 4 Drawing Sheets

REMOTE MIRRORING

TECHNICAL FIELD

Embodiments relate generally to network data forwarding, and more particularly, to methods, systems and computer readable media for remote mirroring.

BACKGROUND

Port mirroring is a technique used on a network switch to send a copy of network packets seen on one switch port (or an entire VLAN) to a system on another switch port, for example, a network monitoring connection. Remote port mirroring involves sending mirrored packets from one switch port to another switch port. Port mirroring may be commonly used for network traffic monitoring devices, such as intrusion-detection systems.

SUMMARY

An embodiment can include a method for remote mirroring of network data frames. The method can include receiving a customer data frame at a first switch and generating a first copy of the customer data frame and a second copy of the customer data frame. The method can also include adding outer headers to each of the first and second copies, where the outer headers have respective outer header destination addresses. For example, the outer headers can be a mac-in-mac headers and the outer header destination address can be a backbone destination address.

An embodiment can include adding a first header to the first copy and a second header to the second copy, where each of the first header and the second headers have a respective backbone component and a service encapsulation component, the backbone component having a backbone destination address and the service encapsulation component having a service identifier.

The method can further include setting the service identifier of the first header to a first predetermined value, the first predetermined value being associated with normal processing of the customer data frame, and setting the backbone destination address of the first header to a destination address corresponding to a destination of the customer data frame.

The method can also include setting the service identifier of the second copy to a second predetermined value, the second predetermined value being associated with remote mirroring, and setting the backbone destination address of the second header to a destination address of a bridge associated with remote mirroring.

The method can include transmitting the first copy and the second copy according to their respective backbone destination addresses.

Another embodiment includes a system having a processor programmed to perform a method similar to that described herein. Yet another embodiment includes a nontransitory computer readable medium having software instructions stored thereon for causing a processor to perform operations according to the method described herein.

DETAILED DESCRIPTION

In general, an embodiment can include a method, system or computer readable medium for remote mirroring. The method can include receiving a customer data frame and making two copies of the customer data frame. A header, such as a mac-in-mac header, can be added to each copy. The header of the first copy can be configured for normal processing, while the header of the second copy can be configured for remote mirroring. The first copy and the second copy can then be transmitted across the network.

When the first copy is received, for example, by a backbone edge bridge, the first copy can be forwarded to an intended destination port associated with that backbone edge bridge and based on a destination address in the customer data frame. The second copy, when received by one or more mirror backbone edge bridges, can be sent to a respective port for processing (e.g., the second copy can be passed to a port connected to a network data traffic sniffer for analysis).

As used herein, mac-in-mac encapsulation refers to provider backbone bridges, which have been standardized as IEEE 802.1ah-2008. While example embodiments are described in reference to a mac-in-mac header, it will be appreciated that other now known or later developed outer (or encapsulating) header formats could be used.

Figure 1:
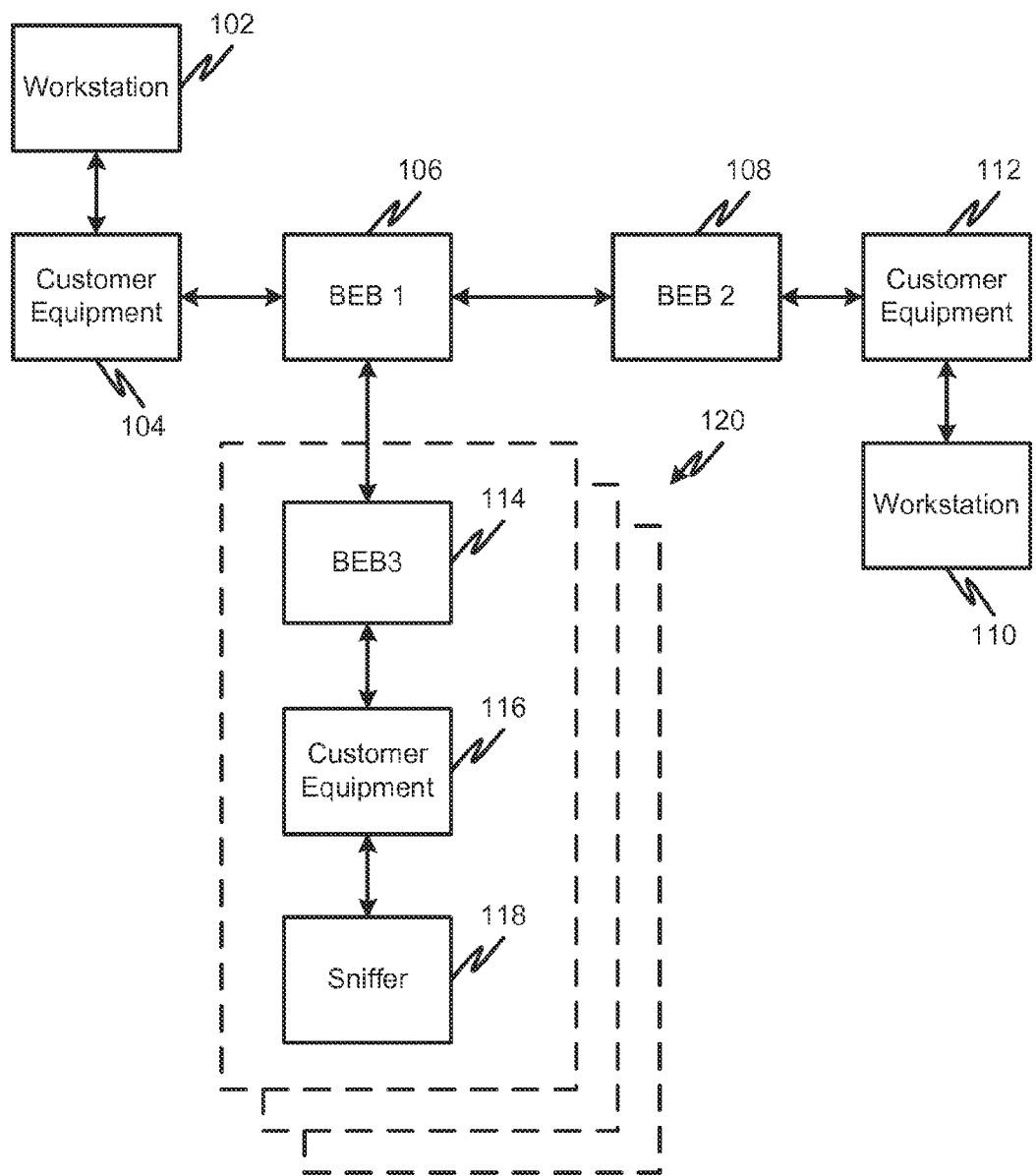
FIG. 1 is a diagram of an example network having remote mirroring in accordance with at least one embodiment.

As shown in FIG. 1, a network 100 includes a first workstation 102, first customer equipment 104, and a first backbone edge bridge 106 (or switch).

In operation, a customer data frame coming from the first workstation 102 through the customer equipment 104 to the first backbone edge bridge 106 (or switch) is analyzed at the first backbone edge bridge 106 and two copies of the customer data frame are made.

A header is added to each of the two copies. The header can be a mac-in-mac header having a backbone component and service encapsulation component. The backbone component can include a backbone destination address and the service encapsulation component can include a service identifier (or ISID).

The first backbone edge bridge 106 makes two copies of the frame. The first copy is sent to a destination backbone edge bridge 108 with an ISID indicating normal processing. The frame is sent to a second workstation 110 via second customer equipment 112.

A second copy of the customer data frame, e.g., the mirror copy, is sent to one or more mirror backbone edge bridges 114 for further processing, e.g., processing by a sniffer 118 connected via third customer equipment 116.

Conventional remote port mirroring techniques may not provide an ability to mirror a frame or packet to multiple mirror systems associated with different switches (e.g., backbone edge bridges). Further, conventional mirroring techniques may require that a header of a frame of interest (e.g., an 802.1, 802.1Q or an 802.1ad frame) be modified prior to mirroring. Such modification of the frame of interest may limit the ability of a system to analyze a mirror packet in which the header information has been changed. By using mac-in-mac encapsulation the customer frame can be copied and sent to a mirror system without a need to modify the customer frame.

The second copy can indicate a unicast address such that the second copy (or mirror frame) is received and processed only by a specific backbone edge bridge. Alternatively, the second copy can indicate a multicast address, in which case, the second copy is sent using an L2 multicast message such that all backbone edge bridges which have the mirror ISID provisioned will receive the mirror frame and process it. It will be appreciated that there could be a plurality of sets of mirror backbone edge bridges, customer equipment and sniffers (or other network data processing equipment), as shown in FIG. 1 at 120. An embodiment can mirror packets based on port, VLAN, Layer 2 VPN service, Layer 3 VPN service or the like.

Every bridge in the SPBm network can have a hostname which is a character string. Instead of specifying a unicast address, which is a 48 bit number, a system can specify a hostname which is a character string. The hostname to 48 bit unicast mac address mapping is performed according to the SPBm standard (IEEE 802.1aq). Thus, when the mirror frame is being sent via a unicast message, the backbone destination address may include the hostname of a bridge associated with mirroring.

Also, alternatively, if no unicast or multicast address is specified by a system or use when using the SPBm network, the backbone destination address of the mirror frame can be set to an auto generated multicast address based on the mirror ISID.

A multicast backbone destination address can be derived based on the ISID in an SPBm Network. IEEE standard 802.1aq specifies how the transit backbone bridges need to forward the packets efficiently based on the Multicast backbone Destination address in the message. In an SPBm network, message replication happens on the backbone bridges only if there are receivers in the downstream path. The SPBm standard specifies how these efficient multicast trees are built based on the ISID. Remote mirroring described here makes use of these efficient multicast trees built based on the SPBm standard for mirroring the messages to multiple receivers in the SPBm network.

Figure 2:
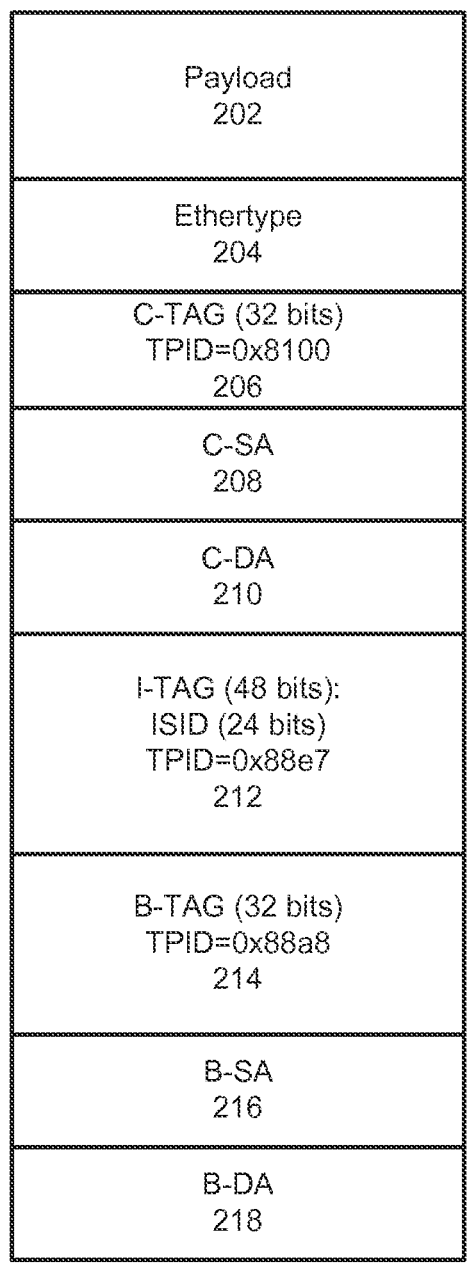
FIG. 2 is a header diagram illustrating mac-in-mac encapsulation in accordance with at least one embodiment.

FIG. 2 is a block diagram of an example data frame 200 according to IEEE Standard 802.1ah (or mac-in-mac encapsulation). The data frame 200 includes a payload 202, ethertype 204, a tag protocol identifier (CTAG/TPID) 206, a customer source address (C-SA) 208 and a customer destination address (C-DA) 210. The data frame also includes a mac-in-mac header having an I-TAG 212, a B-TAG 214 (which can include a backbone VLAN ID), a backbone source address (B-SA) 216 and a backbone destination address (B-DA) 218. A service identifier (or ISID) comprises 24 bits of the I-TAG 212. As shown in FIG. 2, the customer frame (e.g., 202-210) can remain original and unmodified, and the mac-in-mac header (212-218) can be added and used for forwarding the frame and mirroring, without a need to alter the customer data frame.

Figure 3:
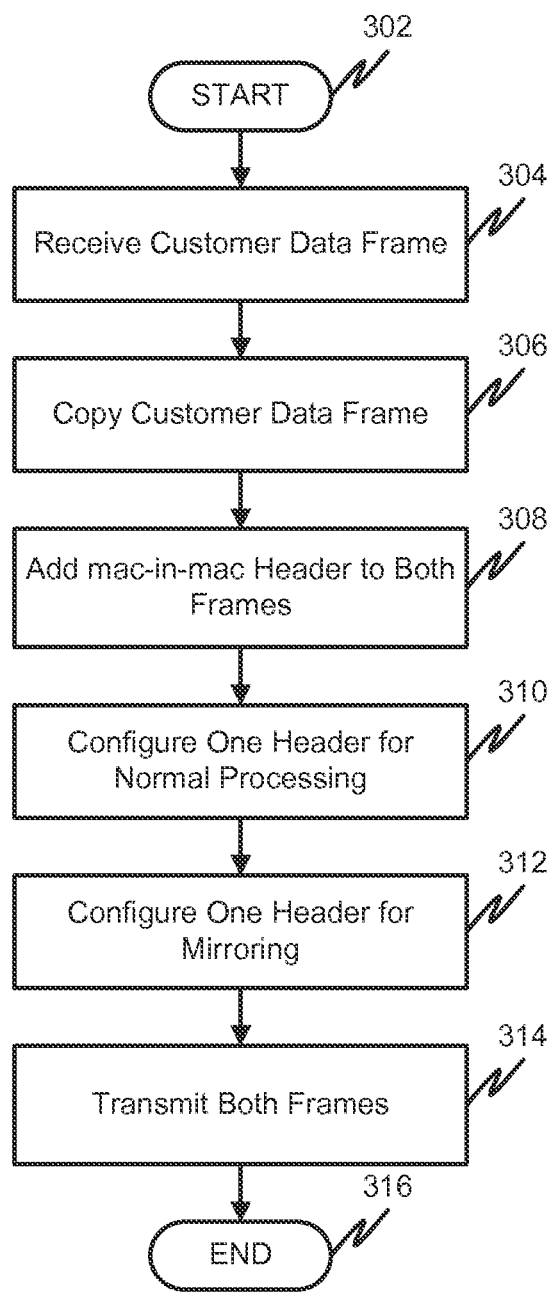
FIG. 3 is a chart showing an example method for frame processing in accordance with at least one embodiment.

FIG. 3 shows a chart of example processing of an in-bound data frame for mac-in-mac encapsulation in accordance with at least one embodiment. In particular, processing begins at 302 and continues to 304.

At 304, a system receives a customer data frame. For example, the system can be a backbone edge bridge of an SPBm (shortest path bridging mac-in-mac) network. Processing continues to 306.

At 306, the system makes two copies of the customer data frame, when mirroring is enabled. Two new copies of the frame can be generated, or the system can use the original copy of the received frame and create one additional copy. In any event, the system will generate two frames to be sent based on the received customer frame. The processing continues to 308.

At 308, the system adds a mac-in-mac header to each copy of the data frame. For example, the system can add a mac-in-mac header according to the example header shown in FIG. 2. Processing continues to 310.

At 310, the system configures the header of one data frame copy for normal processing. The system can configure the header for normal processing by setting the ISID of the mac-in-mac header to a predetermined value associated with normal processing (e.g., to an ISID associated with a VLAN) and setting a backbone destination address to an address associated with the destination (e.g., another backbone edge bridge in an SPBm network) for the customer data frame. Processing continues to 312.

At 312, the system configures the header of the other copy for mirroring. For example, the system can configure the header of the second copy frame for mirroring by setting the ISID to a predetermined value that is associated with port mirroring (e.g., to a value that the network equipment have been configured to recognize as an ISID for mirroring) and setting the backbone destination address to a unicast value for a single backbone edge bridge or to a multicast value for a plurality of backbone edge bridges. Using mac-in-mac encapsulation permits multicast mirroring without a need to modify header information of the customer data frame. Processing continues to 314.

At 314, the system transmits both frame copies (i.e., the normal processing frame and mirror frame). The frames can be transmitted within the SPBm according to outer header destination addresses. Processing continues to 316 where processing ends.

It will be appreciated that a system can repeat 302 through 314 in whole or in part according to a contemplated mac-in-mac encapsulation remote mirroring task.

Figure 4:
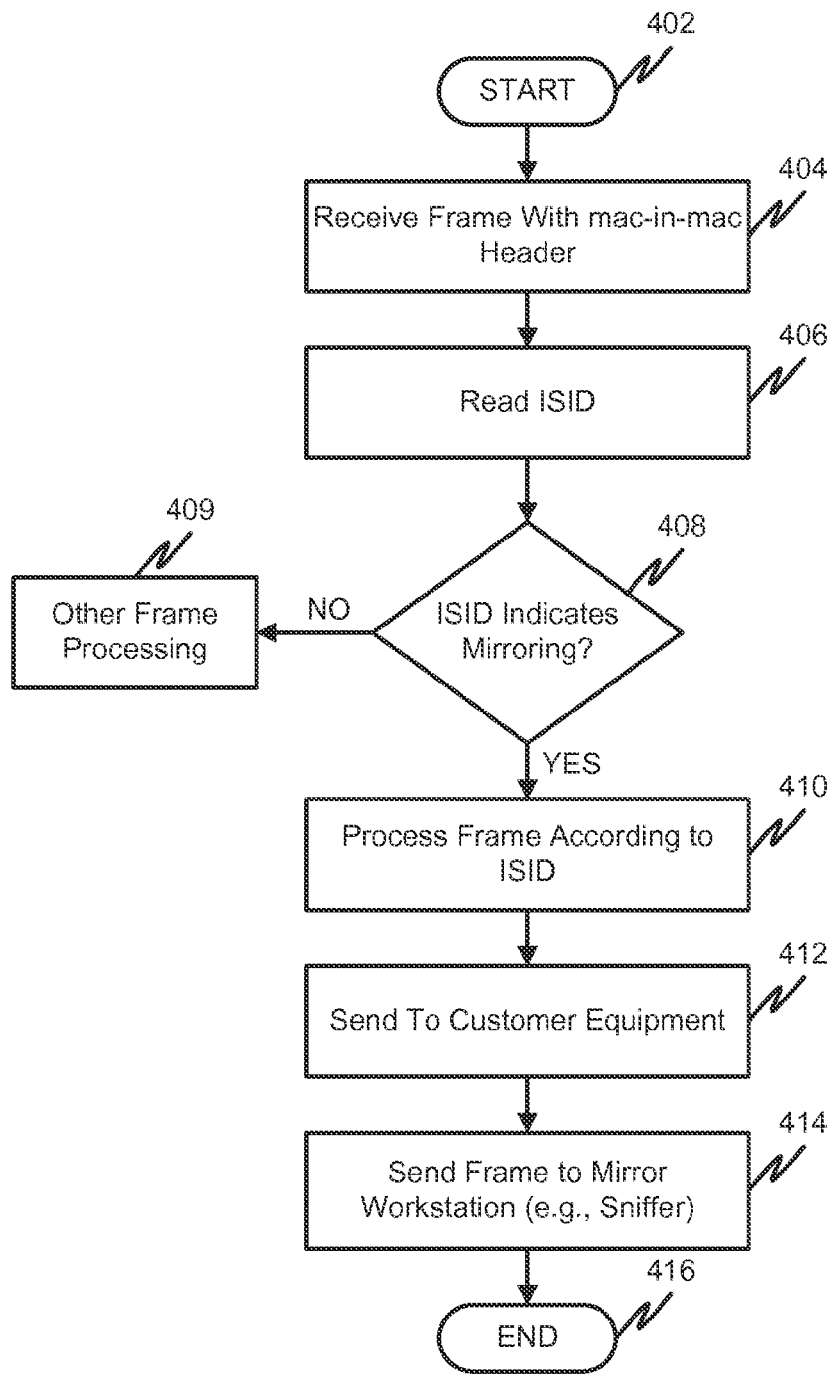
FIG. 4 is a chart showing an example method for mirror frame processing in accordance with at least one embodiment.

FIG. 4 shows a chart of example mirror frame processing using mac-in-mac encapsulation in accordance with at least one embodiment. In particular, processing begins at 402 and continues to 404.

At 404, a system receives a data frame with a mac-in-mac header. For example, the system can include a backbone edge bridge of an SPBm network, where the backbone edge bridge is associated with a mirror system. Processing continues to 406.

At 406, the system reads the ISID of the mac-in-mac header of the received frame. The system can have a table or other structure stored in memory or in a database having a listing of ISID values and an indication of how to process a frame with corresponding ISID values. Processing continues to 408.

At 408, the system determines whether the ISID indicates mirroring (e.g., whether the ISID is set to a predetermined value indicating that the frame is a mirror frame). It will be appreciated that the system evaluates the value of the ISID and it is the value of the ISID that indicates that the frame is a mirror frame and should be processed accordingly. If the value of the ISID indicates a mirror frame, processing continues to 410. If not, processing continues to 409, where other, non-mirroring frame processing is performed.

At 410, the system processes the frame according to the ISID. For example, the ISID may indicate one or more ports to which the frame should be sent. Also, processing the frame can include removing mac-in-mac encapsulation (or removing the outer header). Processing continues to 412.

At 412, the system sends the frame to customer equipment. Processing continues to 414.

At 414, the customer equipment sends the frame to another system, for example, a mirroring workstation (or other system) for processing. The mirroring workstation or system could be a network data sniffer scanning for potential threats or attacks in the network data. The mirroring workstation or system could also be an intrusion detection system. Processing continues to 416, where processing ends.

It will be appreciated that a system can repeat 404-414 in whole or in part in order to accomplish a contemplated mirroring task.

As mentioned above, in addition to indicating remote mirroring, the ISID can also be used to identify a port associated with the mirror backbone edge bridge or other information. Also, header information (e.g., a backbone destination address) of a mirrored message can be used to indicate a single mirror backbone edge bridge via a unicast destination address, or multiple backbone edge bridges via multicast destination address.

Also, in addition to indicating a unicast or multicast message, the ISID can also indicate a one or more ports to which the mirror frame should be sent. By encapsulating mirroring information within a mac-in-mac header, which is a standardized protocol, mirroring using mac-in-mac encapsulation can be provided across a variety of different equipment. Further, by using the mac-in-mac header to accomplish mirroring, an embodiment is able to preserve a customer packet in its entirety to provide a better opportunity for analyzing the customer packet.

In an SPBm network, mac-in-mac encapsulated messages can be carried to remote bridges via multiple equal cost paths. An embodiment of remote mirroring described herein can make use of the equal cost multiple paths provided by an underlying SPBm network to carry the remote mirroring traffic.

Advertising of the bridges which are sources and receivers of the mirrored traffic is done by configuring the mirror ISID in all the sender and receiver bridges. The mirror ISID information used for remote mirroring is exchanged between the senders and receivers as described in the SPBm (IEEE 802.1aq) standard. This is how remote mirroring traffic can be carried over to only those bridges which are configured to receive the mirror ISID traffic and not to any other bridges in a SPBm network.

In a SPBm network, an embodiment of remote mirroring can make use of the core B-VLAN and the associated traffic paths. The core B-VLAN and the associated traffic paths can be used to carry the user traffic itself and the mirror traffic. Thus, there may be no need to provision a different core B-VLAN just to carry remote mirroring traffic.

It will be appreciated that the modules, processes, systems, and sections described above can be implemented in hardware, hardware programmed by software, software instructions stored on a nontransitory computer readable medium or a combination of the above. A system for remote mirroring, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product)

can be implemented in software executed on a programmed general purpose computer, a special purpose computer, a microprocessor, or the like.

It is, therefore, apparent that there is provided, in accordance with the various embodiments disclosed herein, systems, methods and computer readable media for remote mirroring using mac-in-mac encapsulation.

While the invention has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the invention.

What is claimed is:

1. A method for remote mirroring of network data frames, the method comprising:
   receiving a customer data frame at a first switch;
   generating a first copy of the customer data frame and a second copy of the customer data frame;
   adding a first header to the first copy and a second header to the second copy, each of the first header and second header having a backbone component and a service encapsulation component, the backbone component having a backbone destination address and the service encapsulation component having a service identifier, wherein the service identifier includes an Individual Service Identifier (ISID);
   receiving the second copy at a mirroring system; and
   processing the second copy, at the mirroring system, based on a value of the service identifier in the second header.

2. The method of claim 1, further comprising:
   setting the service identifier of the first header to a first predetermined value, the first predetermined value being associated with normal processing of the customer data frame;
   setting the backbone destination address of the first header to a destination address corresponding to a destination of the customer data frame;
   setting the service identifier of the second copy to a second predetermined value, the second predetermined value being associated with remote mirroring;
   setting the backbone destination address of the second header to a destination address of a bridge associated with remote mirroring; and
   transmitting the first copy and the second copy according to their respective backbone destination addresses.

3. The method of claim 1, wherein the first header and the second header are each a mac-in-mac header.

4. The method of claim 2, wherein setting the backbone destination address of the second header includes specifying a hostname of a bridge associated with remote mirroring, when the backbone destination address is a unicast address.

5. The method of claim 2, wherein setting the backbone destination address of the second header includes setting the backbone destination address of the second header to an auto generated multicast address based on the service identifier in the second header.

6. The method of claim 1, wherein processing the second copy further comprises:
   reading header information from the second copy, the header information including the service identifier;
   determining that the service identifier indicates mirroring; and
   providing the second copy to one or more ports on one or more bridges based on the service identifier.

7. The method of claim 6, wherein transmitting includes using a core B-VLAN and associated traffic paths to carry the first copy and the second copy.

8. A system comprising:
   a processor coupled to a computer readable medium, the computer readable medium having stored thereon software instructions that, when executed by the processor, cause the processor to perform a series of operations, the operations including:
   receiving a customer data frame at a first switch;
   generating a first copy of the customer data frame and a second copy of the customer data frame;
   adding a first header to the first copy and a second header to the second copy, each of the first header and second header having a backbone component and a service encapsulation component, the backbone component having a backbone destination address and the service encapsulation component having a service identifier, wherein the service identifier includes an Individual Service Identifier (ISID);
   receiving the second copy at a mirroring system; and
   processing the second copy, at the mirroring system, based on a value of the service identifier in the second header.

9. The system of claim 8, wherein the first header and the second header are each a mac-in-mac header.

10. The system of claim 8, wherein the operations further comprise:
    setting the service identifier of the first header to a first predetermined value, the first predetermined value being associated with normal processing of the customer data frame;
    setting the backbone destination address of the first header to a destination address of the customer data frame;
    setting the service identifier of the second copy to a second predetermined value, the second predetermined value being associated with remote mirroring;
    setting the backbone destination address of the second header to a destination address of a bridge associated with remote mirroring; and
    transmitting the first copy and the second copy according to their respective backbone destination addresses.

11. The system of claim 10, wherein setting the backbone destination address of the second header includes setting a unicast destination address.

12. The system of claim 10, wherein setting the backbone destination address of the second header includes setting a multicast destination address and transmitting the second copy includes using multicast trees built in a Shortest Path Bridging Mac-in-Mac (SPBm) network for mirroring the second copy to a plurality of receivers in the SPBm network.

13. The system of claim 8, wherein processing the second copy further includes:
    reading header information from the second copy, the header information including the service identifier;
    determining that the service identifier indicates mirroring; and
    providing the second copy to one or more ports on one or more bridges based on the service identifier.

14. The system of claim 10, wherein the transmitting includes using equal cost multiple paths provided by an underlying SPBm network to carry the second copy.

15. A nontransitory computer readable medium having stored thereon software instructions that, when executed by a processor, cause the processor to perform a series of operations comprising:
    receiving a customer data frame at a first switch;

generating a first copy of the customer data frame and a second copy of the customer data frame;

adding a first header to the first copy and a second header to the second copy, each of the first header and second header having a backbone component and a service encapsulation component, the backbone component having a backbone destination address and the service encapsulation component having a service identifier, wherein the service identifier includes an Individual Service Identifier (ISID);

receiving the second copy at a mirroring system; and processing the second copy, at the mirroring system, based on a value of the service identifier in the second header.

16. The nontransitory computer readable medium of claim 15, wherein the first header and the second header are each a mac-in-mac header.

17. The nontransitory computer readable medium of claim 15, wherein the operations further include:

setting the service identifier of the first header to a first predetermined value, the first predetermined value being associated with normal processing of the customer data frame;

setting the backbone destination address of the first header to a destination address of the customer data frame;

setting the service identifier of the second copy to a second predetermined value, the second predetermined value being associated with remote mirroring;

setting the backbone destination address of the second header to a destination address of a bridge associated with remote mirroring; and transmitting the first copy and the second copy according to their respective backbone destination addresses.

18. The nontransitory computer readable medium of claim 17, wherein setting the backbone destination address of the second header includes setting a unicast destination address.

19. The nontransitory computer readable medium of claim 17, wherein setting the backbone destination address of the second header includes setting a multicast destination address.

20. The nontransitory computer readable medium of claim 15, wherein processing the second copy further comprises:

reading header information from the data frame, the header information including the service identifier;

determining that the service identifier indicates mirroring; and providing the second copy to one or more ports on one or more bridges based on the service identifier, wherein the one or more ports are coupled to a network data analysis system.

* * * * *